Patented Dec. 12, 1933

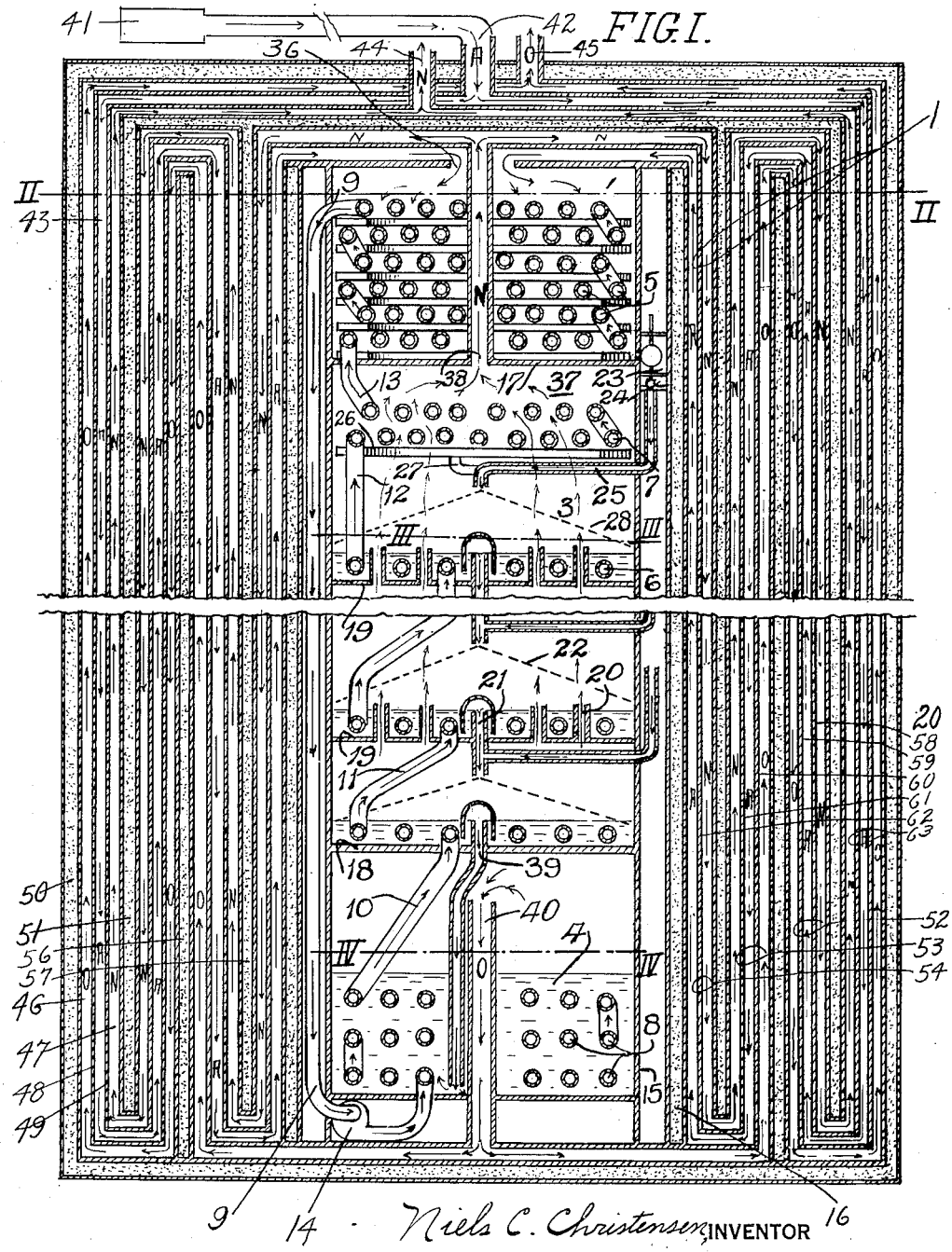

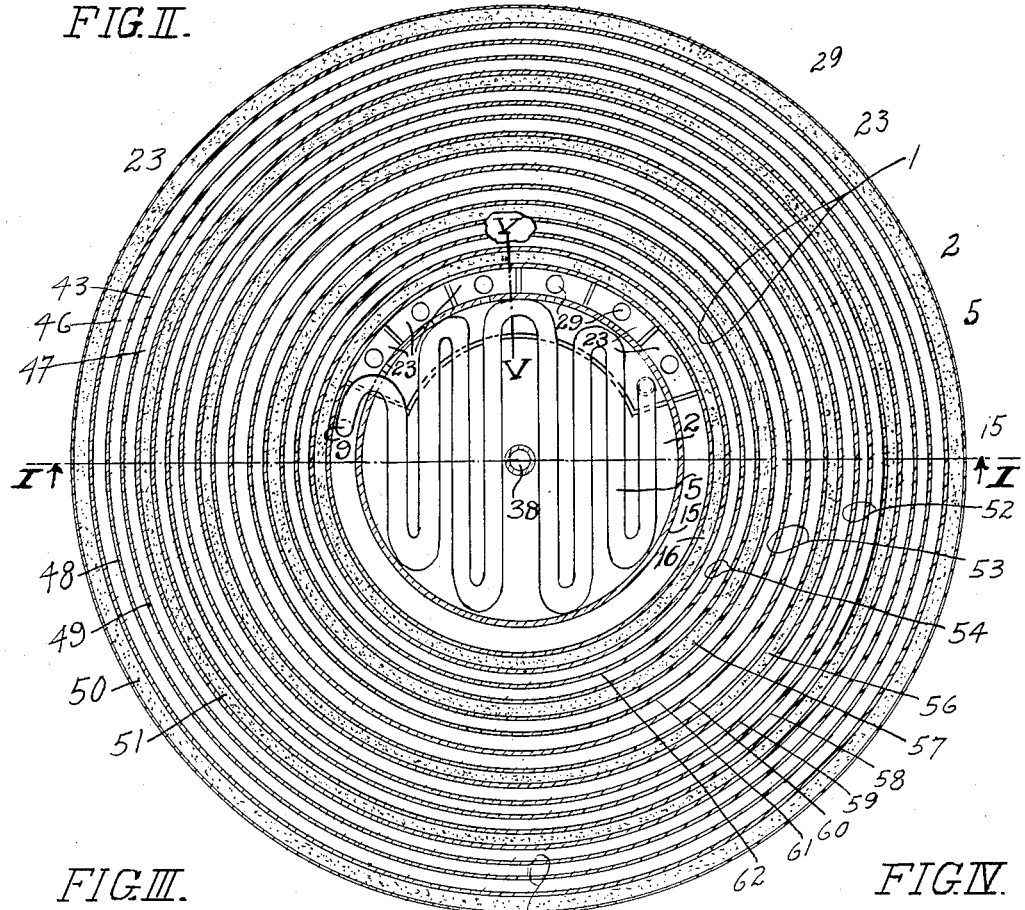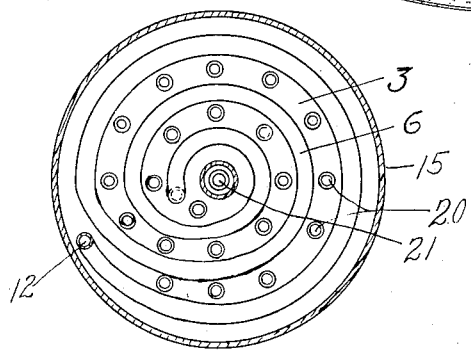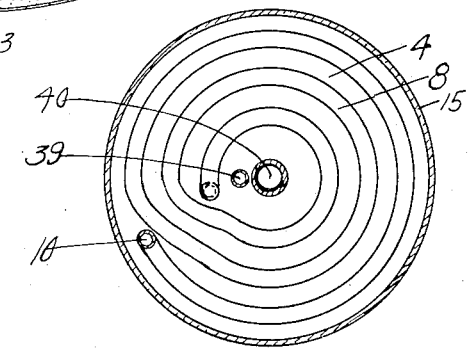

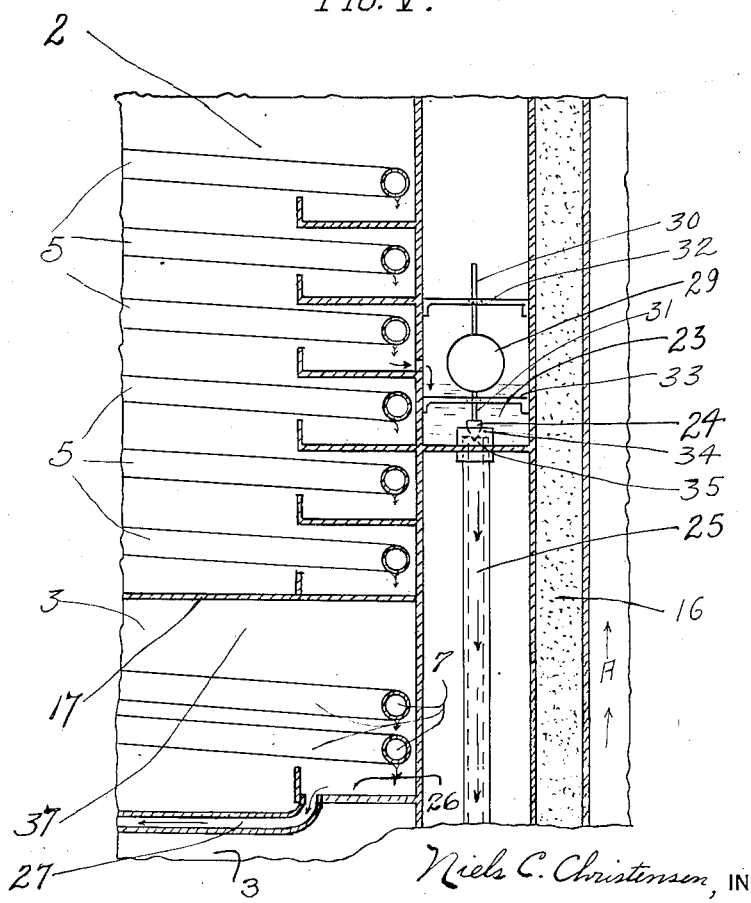

1,939,104

UNITED STATES PATENT OFFICE 1,939,104

PROCESS FOR THE SEPARATION OF GASES

Niels C. Christensen, Salt Lake City, Utah

Application March 8, 1930. Serial No. 434,338

6 Claims. (Cl. 183—115)

This invention relates to a process for the separation of gases by liquefaction and fractional distillation or differential evaporation. It is especially applicable to the separation of oxygen and nitrogen in air, but is also applicable to the separation of other gas mixtures such as hydrogen and carbon monoxide in water gas, carbon dioxide and methane in mixtures of natural gases, etc., etc.

It is the object of my invention to greatly lower the cost of such separations by reducing the power required and by carrying out the operation at a relatively low pressure or low pressure difference so that the cost for oil, water, maintenance, etc., are also largely cut down.

I attain these objects by the efficient transfer of heat from the incoming unseparated gases to the outgoing separated gases and particularly by the transfer of the heat of condensation of the liquefying gases to the evaporating liquid. The efficiency of the separation is also aided in my invention by the especially efficient differential condensation and evaporation which are possible with my method and apparatus.

The carrying out of my process under relatively low difference in pressure between the condensing and evaporating gases is made possible by the efficient transfer of heat from the condensing gases to the evaporating liquids, the pressure in the condenser being maintained sufficiently higher than in the evaporator to make possible a sufficiently rapid transfer of heat from the condensing gases to the evaporating liquid.

The higher pressure in the condenser brings about the condensation of the incoming cold gases at a sufficiently higher temperature and the lower pressure in the evaporating chamber brings about the evaporation of the condensed gases at a sufficiently lower temperature that the heat of condensation of the liquefying gases may be transferred to the evaporating gases. This heat transfer from the condensing gases to the evaporating liquid is carried out by passing a suitable fluid through heat transfer pipes or coils in contact with the liquefying gases in the condensing chamber and then passing this warmed fluid through other heat transfer pipes or coils in the evaporating chamber or still, this circulation of heat transfer fluid being maintained at a sufficient rate to allow a relatively small difference in temperature in the condenser and evaporation and yet secure a rapid transfer of heat from the condensing gases to the evaporating liquid. The maintenance of the higher pressure in the condensing portion of the apparatus as compared with the pressure in the evaporating chamber brings about the condensation of the incoming cold gases from the counter-current heat transfer portion of the apparatus at a higher temperature than that at which the liquid, i. e. condensed gases, are evaporating in the evaporating chamber.

The latent heat of evaporation of the condensing liquid at the lower pressure being greater than the latent heat of condensation of the gases at the higher pressure, and the temperature of condensation at the higher pressure being higher than the temperature of evaporation at lower pressure, the process of condensation and evaporation will maintain itself as long as sufficient difference in pressure is maintained between the gases in the condenser and the gases in the evaporator. The required difference in pressure will depend on the efficiency of heat transfer between the incoming and outgoing gases and the perfection of the insulation of the apparatus against heat absorption from the outside. With perfect heat transfer from the incoming warm unseparated gases to the outgoing cold separated gases and with perfect insulation of the apparatus against heat absorption from the outside, the only difference in pressure required would be that sufficient to compress the separated gases from their partial pressures in the gas mixture to the original total pressure of the mixture, i. e., in most cases to one atmosphere. The power required under these ideal conditions would therefore be only that needed to compress the gases from their partial pressures in the mixed gases to their final pressures in the separated gases, which would be a small fraction of the power required in the processes now in common use for the separation of mixed gases by the methods of Linde and Claude. The actual power required in excess of this theoretical minimum will depend on the efficiency of heat transfer between the incoming and outgoing gases and on the perfection of heat insulation of the apparatus, and with properly designed apparatus may be made to closely approach the theoretical limit.

The capacity of the apparatus per unit of heat transfer surface of the coils for circulating the heat transfer fluid between the evaporating and condensing chamber will depend upon the difference in pressure maintained between these chambers, the larger the amount of heat transfer surface the smaller will be the difference in pressure required and the lower the power requirement. Practical considerations as to power cost and cost of apparatus will determine the difference in pressure used for any particular operation.

From the foregoing it will be noted that the operation of my process depends upon the maintenance of a slightly higher pressure in the condensing chamber than in the evaporating chambers. This difference in pressure may be secured by supplying the air or mixed gases under a pressure greater than atmospheric and withdrawing the separated gases at substantially atmospheric pressure, or by supplying the gases at high pressure and withdrawing the separated gases at a lower pressure, or by supplying air or mixed gases at atmospheric pressure and withdrawing the separated gases at less than atmospheric pressure, or by supplying the air or mixed gases at a pressure somewhat greater than atmospheric and withdrawing the separated gases at a pressure below atmospheric, i. e., the important thing is the maintenance of the proper difference in pressure and not the absolute pressures maintained. Except under special conditions the preferred method will be that of supplying the air or mixed gases a sufficiently greater than atmospheric pressure and withdrawing the gases at substantially atmospheric pressure, or sufficiently above atmospheric pressure to send the gases to the storage tanks or gas holders at low pressure.

It is obvious that if the process is carried out at pressures entirely above atmospheric that the separated gases at such pressure must be passed through suitable engines and allowed to do work in compressing other incoming air to recover the power stored in the gases above atmospheric pressure if the power consumption is to be kept at the minimum. If the separated gases under pressure are preheated before doing this work, sufficient excess power may be generated from this heat supply to furnish the power required in the process.

The fluids which may be used for heat transfer between the condensing chamber and evaporating chamber are relatively few owing to the low operating temperature. Liquid air, liquid oxygen or liquid nitrogen may be used and in most cases liquid air will be the medium used since it is made in the process. Gases such as hydrogen, helium or neon may also be used for this purpose but would require a much larger heat transfer surface in the coils or pipes owing to the lower rate of heat conduction to and from gases as compared with liquids.

By my method it is possible to secure the highest efficiency of separation of the gases due to the fact that by their use is it possible to take advantage to the fullest extent of the differential condensation of the gases and also of their differential evaporation. This is brought about in my preferred form of apparatus by carrying out these operations in countercurrent to the heat transfer fluid so as to separate the gases as far as possible first in the condensation and then in the evaporation.

My process or method of separating gases may be used with apparatus similar to those now in common use by the addition of the coils or pipes in the condensing and evaporating chambers of such apparatus, for circulating the heat transfer fluid through these chambers so as to transfer the heat of condensation from the condensing chamber to the evaporating chamber as previously described. The preferred form of apparatus shown, however, secured a number of advantages in heat insulation and counter current operation and may therefore be used in preference to other forms. Since my method or process may be used in a large number of forms or different arrangements of the essential parts of the apparatus I do not desire to be limited entirely by the special forms shown except as these are illustrative of the process and as they are interpreted in the claims.

The accompanying drawings illustrate the manner in which my method or process is carried out and show in more or less diagrammatic form one of the types or arrangements of apparatus which may be used. Figure I is a vertical section of the apparatus taken on line I—I of Fig. II. Figures II, III and IV are horizontal sections on the lines II—II, III—III and IV—IV respectively of Figure I. Figure V is an enlarged vertical section on the line V—V of Figure II showing the method of securing separate condensates in the condensing chamber and a form of float valve which may be used to regulate the flow of the condensates from the condensing chamber to the evaporating chamber.

The apparatus consists of the following five main parts: a counter current heat transfer apparatus (1) for transferring the heat of the incoming unseparated gases to the outgoing separated gases, a condensing chamber (2) in which the gases cooled in the counter-current heat transfer apparatus are condensed or liquefied, a differential still or evaporator (3) in which the liquid from the condensing chamber is subjected to differential evaporation so that the nitrogen (or gas of lower boiling point) is evaporated and the oxygen is left in liquid form, an oxygen evaporating chamber (4) in which the liquid oxygen from the differential still or evaporator is evaporated, and finally the heat transfer pipes or tubes (5) in the condenser (2) and (6) and (7) in the differential evaporating chamber and (8) in the oxygen evaporating chamber (4) together with their connecting pipes (9 to 13) and circulating pump (or fan) (14) for circulating the liquid heat transfer medium, such as liquid air, liquid oxygen, liquid nitrogen (or gaseous medium such as hydrogen, helium or neon). These main parts of the apparatus are preferably assembled in concentric fashion as one apparatus, as shown in the drawings, in order to reduce absorption of heat from the outside environment to a minimum. Other arrangements are possible however, for example, the counter-current heat interchange passages (1) may be grouped as a separated unit, and the condensing chamber (2) and evaporating chambers (3) and (4) may be in separate units connected by the heat transfer pipes for circulating the fluid heat transfer medium between the condenser and evaporators. Such subdivision of the apparatus would result in considerably greater heat absorption and would require much more insulation to prevent a considerable increase in the power required.

As shown in the drawings the preferred arrangement of the apparatus consists of a vertical cylindrical shell (15) closed at both ends and surrounded by a layer of heat insulating material (16). The chamber within this shell is divided into three parts by the horizontal partitions (17) and (18). The upper compartment (2) is the condensing chamber (2), the middle compartment (3) is the differential still or nitrogen evaporator (3), and the lower compartment (4) is the oxygen evaporator. In the condensing chamber are the condenser or heat transfer tubes (5) through which the cold liquid air (or other fluid heat transfer medium such as liquid oxygen, liquid nitrogen, or hydrogen, helium or neon gas) for absorption of the heat of condensation of the condensing gases is circulated. In order to secure a counter current effect these tubes are so connected that the circulating medium enters at the bottom and after passing successively upward through each layer or tier of tubes or pipes is discharged from the upper tier of pipes through the down-take pipe (9). The heat transfer surface in these condenser pipes or tubes (5) is made substantially equal to the combined heat transfer surface of all the heat transfer tubes (6, 7 and 8) in the evaporating chambers (3 and 4). In the oxygen evaporating chamber are the evaporator or boiler tubes (8) connected with the condenser tubes (5) by the down-flow pipe (9). The differential still or selective evaporator (3) is divided into a series of stages by the shallow perforated basins or pans (19) in which are placed the evaporator or boiler tubes (6). The open gas flow pipes (20) through these pans extend slightly above the top of the tubes (6). In the middle of each evaporator pan or basin (19) is an overflow pipe (21) extending to a height slightly less than the tops of the gas flow pipes (20). At the lower end of each over-flow pipe is a conical screen (22) extending from its apex beneath the lower end of the overflow pipe (21) to the periphery of the evaporator pan (19) beneath. The upflow pipe (10) leads from the evaporator coils (8) in the condensing chamber (4) to the evaporator coils (6) in the lowest stage of the differential still and the upflow pipes (11) lead from the evaporator tubes in each evaporator pan (19) to the evaporator tubes (6) in the pan (19) next above, the outside of each lower evaporator coil (6) being connected with the middle of the evaporator coil (6) above. In the upper part of the differential still are the special condensing tubes (7) connected with the upflow pipe (12) and to the lowermost condensing tubes (5) in the condenser chamber (2) by the upflow pipe (13). The total heat transfer surface of the evaporator tubes (6) in the differential still (3) should be made slightly greater than four times the area of the heat transfer surface of the evaporator tubes (8) in the oxygen evaporator (4) to allow for the redistillation or re-evaporation effect occurring in the still (or in proportion to the relative volumes of the gases in other mixtures). The total heat transfer surface of the evaporator tubes (6 and 8) should be made approximately equal to or slightly greater than the total heat transfer surface of the condenser tubes (5 and 7). The successive tiers or layers or condenser tubes (5) in the condensing chamber (2) slope gently to one side of the chamber to the series of condensate reservoirs (23) placed one above the other as shown in section in Fig. V. From these condensale reservoirs the separate condensates flow through the regulating valves (24) and condensate pipes (25) to separate evaporating pans (19) in the still (3), the condensate from the upper basin going to an upper evaporating pan and the condensate from successively lower basins going to successively lower evaporating pans as shown. The condensate from the condensing pipes (7) in the upper part of the evaporating chamber or still (3) flows into the condensate reservoir (26) and through the condensate pipe (27) and over the conical screen (28) into the periphery of the uppermost evaporating basin. The reservoir 26 is in the form of a sector of an annular trough similar to the basins (23), beneath which it is placed as shown in section in Fig. V. The float valves (24) consist of a float (29) held in place by the stems (30) and (31) in the guides (32) and (33). The lower end of the lower stem (31) rests on the valve seat (34) when the liquid in the reservoir allows the float to fall and is lifted from the seat (34) when the liquid rises in the reservoir so as to allow the condensate to flow through hole (35) and the pipes (25) to the evaporating pans below.

The exact form of differential still described in the foregoing is not essential to the successful operation of the process as any efficient still of this type may be used, if supplied with the boiler tubes (6) arranged to evaporate the condensates in counter-current as shown.

The cooled air from the counter-current heat transfer passages (1) enters the upper part of the condensing chamber (2) through the opening (36). The evaporated nitrogen flows from the differential still from the space at (37) its upper end through the opening (38) to the counter-current heat interchanger (1). The liquid oxygen from the differential still (3) flows to the bottom of the oxygen evaporating chamber (4) through the overflow pipe (39). The evaporated oxygen flows from the evaporating chamber (4) to the counter-current heat transfer passages (1) through the outlet opening (40).

The counter-current heat interchange system (1) consists preferably of a series of annular chambers surrounding the condenser (2) and evaporators (3) and (4) so arranged that the incoming air or mixed gases first transfers its heat by counter current heat interchange to both of the outgoing gases simultaneously and then to the outflowing nitrogen (or gas of higher evaporating temperature) before entering the condenser (2). The object of the separate heat interchange with the nitrogen (or gas of higher evaporating temperature) being to raise the temperature of this gas to that of the oxygen (or gas of lower evaporating temperature) before beginning the simultaneous heat transfer to the two outgoing gases. By this method the greatest efficiency of heat transfer is secured and the temperature of the incoming air (or other mixed gases) is reduced to the lowest possible point before entering the condenser (2). The drawings illustrated the arrangement and method of insulation of this portion of the apparatus. The air or gas mixture from the compressor (41) or gas cleaner (not shown) enters the counter-current heat interchange system through the inlet pipe (42) and flows longitudinally through the outer counter-current heat interchange passage (63). This heat interchange passage is formed by the air (or mixed gas) passage (43) between the oxygen and nitrogen passages (46) and (47). In these passages the air, or gas mixture, flows inward counter current to the separated gases which flow outward to their respective outlets (44) and (45). The walls (48) and (49) of these passages are of good heat conducting material so that the heat of the incoming gases is transferred to the outgoing gases. The walls (50) and (51) of these passages are of heat insulating material to prevent radial flow of heat from the outside to the inside of the apparatus. This simultaneous counter current heat interchange between the incoming mixed gases and both of the outgoing separated gases is continued in the succeeding similar inner heat interchange passages (52) and (53). In the inner heat interchange passage (54) occurs the final counter current heat interchange between the inflowing air (or other mixed gases) and the outflowing nitrogen (or gas of lower evaporating temperature) after which the cooled air (or gas mixture) enters the condenser (2) through the inlet (36). The flow of the different gases as indicated by the arrows on the drawings and by the letters A, O and N indicating air, oxygen and nitrogen respectively, or if other gas mixtures, A indicates the mixed gases, O the gas of higher evaporating temperature, and N the gas of lower evaporating temperature. The condensing chamber (2) and evaporating chambers (3 and 4) are separated from the counter-current heat transfer passages (1) by the heat insulating wall (16) and the entire apparatus is surrounded by the heavy heat insulating wall (50). The heat transfer passages are separated from each other by the heat insulating walls (51), (56), and (57). The heat interchange passages are divided into the separate gas passages by the heat conducting walls 48 and 49, 58 and 59, 60 and 61 and (62). It will be apparent that the arrangement of passages shown reduces to a minimum, the inward radial flow of heat from the outside or from any outer annular heat interchange passage to any inner heat interchange passage or to the condensing (2) and evaporating chambers (3 and 4) and by reducing the temperature differences in the apparatus and to the outside exposed surface to a minimum, keeps the heat absorption as low as possible, and also secures a very efficient counter-current heat interchange between the incoming and outgoing gases.

The number of separate annular heat interchange passages will depend on the size of the apparatus and the volume of gas handled. The construction shown allows of as many of each of these concentric passages as is desired, arranged concentrically around the cylindrical condensing and evaporating chambers.

Though this is the preferred form, any arrangement of heat interchanged passages may be used. This part of the apparatus may also be separated from the condensing and evaporating chambers if desired, though such arrangement may result in greater heat absorption.

The operation of the apparatus for the carrying out of my process will be apparent from the foregoing, but a brief description is given in the following. In this description it is assumed that the apparatus is in operation as this process and apparatus is not self-starting but must be started by supplying liquid air (or other liquid gas mixture) to the apparatus from an external source (or the apparatus may be arranged to start with the standard high pressure arrangement of the Linde type of apparatus and after securing a supply of liquid air may be cut over to operate by my method as described.)

The air (or other mixture of gases to be separated) from the compressor (41) enters the counter-current heat interchanger through the inlet pipe (42) and flows successively through the heat interchange passages (63), (52) and (53) counter-current to the outflowing separated gases, and finally through the heat interchange passage (54) in counter-current to the outflowing nitrogen, (or gas of lower boiling point) and enters the condensing chamber (2) through the inlet pipe (36). In this passage through the counter-current heat interchanger (1) the air (or other gas mixture) has given up its heat to the outgoing cold nitrogen and oxygen (or other separated gases) and has been reduced to the lowest possible temperature before entering the condensing chamber, and the outflowing separated gases have been warmed practically to the original temperature of the air (or mixed gases). In the condensing chamber (2) the cooled air (or other gas mixture) comes in contact with the condensing tubes or pipes (5) in which the cold liquid air (or other suitable fluid heat transfer medium) is being circulated by the pump (or fan) (4), from the evaporating tubes (6) and (8) in the evaporating chambers (3) and (4). The liquid in these tubes being cooled by the evaporation of the nitrogen and oxygen in the evaporating chambers (3) and (4) at the lower pressure is at a lower temperature than that required for condensing or liquefying the air (or other gas mixture) at the higher pressure in the condensing chamber. As a result, the cold air (or other gas mixture) entering the condenser (2) condenses as rapidly as its heat of condensation is removed by the cold circulating medium passed through the condenser tubes (5). The condensation thus brought about in the condensing chamber (2) is selective, i. e., the condensate in the upper part of the chamber is richer in oxygen (or the gas of higher boiling point) and successively poorer in oxygen (or other similar gas) in the lower part of the chamber. To take advantage of this separation, the tiers of condensing tubes slope toward the small condensate reservoirs (23) so that the condensates forming on each tier of pipes runs into a separate reservoir (23) and the condensates are thus kept separate. From the condensate reservoirs (23) the condensates flow through the regulating valves (24) and separate condensate pipes (25) to the evaporating stages or pans (19) in the differential still (3). The condensates richest in oxygen (or high boiling point gas) from the upper condensate reservoir goes to a lower pan in the still and the successive condensates successively poorer in oxygen (or other similar gas) to successively higher pans in the still (3), the condensate richest in nitrogen (or other low boiling gas) being delivered to the upper one of this series of stages or evaporating pans.

The condensate delivered to these pans comes in contact with the evaporating tubes (6) containing the warmed liquid air (or other fluid medium) circulated by the pump (14) from the condensing tubes (5) in the condenser (2). The heat of condensation of the gases at higher pressure and temperature in the condenser (2) is thus transferred to the evaporating stills and furnishes the heat for evaporating the nitrogen, and oxygen, (or other gases) at lower pressure and lower temperature in the evaporating stills. As the nitrogen (or other lower boiling point gas) evaporates or boils at a lower temperature than the oxygen (or other higher boiling point gas) and the heat transfer fluid in the boiler or heat transfer tubes (6) becomes successively colder in its passage successively up through the oxygen (or high boiling point gas) evaporator or boiler (4) and upward through the successive stages of the differential still (3), the nitrogen is evaporated first leaving the liquid oxygen (or other similar gas) behind. This action is assisted by the preliminary partial separation in the condenser (2). As the liquid rich in oxygen accumulates in the pans it overflows through the overflow pipes (21) and down over the conical screens (22) to the periphery of the evaporating pan or stage below. As the liquid moves downward it becomes richer in oxygen and is discharged from the lowermost pan of the differential still into the oxygen evaporator (4) through the overflow pipe (39) as practically pure oxygen (or as a liquid containing such percentage of oxygen as is desired.) The nitrogen gas evaporated from the pans passes upward through the conical screens (22) over which the overflow liquid from the pans is trickling and upward through the successive stages or pans through the pies (20). In this upward passage in contact with the pans and screens the nitrogen is washed by the descending fluid on the screens, the oxygen in the gas condensing and the nitrogen in the liquid evaporating. The nitrogen gas reaching the upper part of the still is thus relatively free from oxygen. Before passing from the still however, the nitrogen gas (or other lower boiling point gas) comes into contact with the condensing pipes (7) in which the circulating heat transfer fluid is at its lowest temperature and the last portion of oxygen is removed and returned to the evaporating stage below through the reservoir (26) and pipe (27). The nitrogen (or other low boiling point gas) escapes from the space (37) at the top of the differential still (3) through the outlet (38) to the counter-current heat interchanger (1) where it flows successively through the heat interchange passages (54), (53), (52), and (63) counter current to the incoming air (or other gas mixture) and is discharged at substantially the temperature of the incoming air (or similar gas mixture) through the outlet pipe (44). The liquid oxygen (or other similar gas) in the oxygen evaporating chamber (4) is heated by the warmed heat-transfer fluid from the condenser (2) circulated through the heating or boiler tubes (8) and is evaporated and passes out to the counter-current heat interchanger (I), through the pipe (40), passing counter current to the incoming air successively through the heat interchange passages (53), (52) and (63) to the outlet pipe (45). In its outward flow it abstracts heat from the incoming mixed gases and is warmed approximately to the original temperature of the incoming air (or other gas mixture). It should be particularly noted that the heat interchange between the condensing chamber and the evaporating chamber by means of the circulating fluid in the condenser pipes (5) and evaporator pipes (8) and (6) is arranged in counter current to the flow of gas and liquid so as to secure the maximum efficiency in heat transfer and the most selective evaporation in the evaporating still (3). This will be apparent from the following description: The circulating fluid leaving the upper tier of condensing tubes (5) is at its highest temperature. It passes down to the oxygen evaporating chamber, through the pipe (9), and circulates through the boiler tubes (8) giving up heat to the liquid oxygen (or other similar gas) and evaporating it. In this operation, the circulating fluid is partly cooled and arrives at the bottom of the differential still (3) at a slightly lower temperature. In its passage upward through the successive stages of the differential still (3) it is progressively cooled by the evaporation of the nitrogen and arrives at the top of the still in the auxiliary condensing and cooling coils (7) at its lowest temperature. Passing into the condenser (2) it is at its lowest temperature in the lowermost tubes (5) becoming gradually warmer in its upward passage through the successive tiers of tubes. Thus in the condenser the heat transfer fluid is warmest in heat interchange contact with the more easily condensed gases richest in oxygen (or other similar gas) and coldest in contact with the most difficultly condensed gases richest in nitrogen (or other similar gas), thus securing a very selective condensation in the condenser, due to this counter current effect. Similarly in the evaporators the circulating fluid is at its highest temperature in the oxygen evaporator (4) in heat interchange contact with the liquid most difficult to evaporate, i. e., richest in oxygen (or other similar gas) and successively colder in its upward passage through the differential still (3) in contact with fluids successively less difficultly to evaporate as they increase in nitrogen content, being coldest at the top of the still in contact with the liquid most easily evaporated, i. e., richest in nitrogen (or other lower boiling point gas). In this way a very selective evaporation of the liquids in the differential still is secured. It should be noted that in the design shown the passage of the circulating fluid in the pipes (6) in the evaporating pans or stages (19) is counter current to the flow of evaporating liquid, the circulating liquid entering the heating coils (6) near the middle of the pan (19) and leaving at the outside and that the evaporating fluid entering the pan at the periphery and leaving through the overflow pipe (21) at the centre, thus carrying out the counter current effect even in the separate stages. It should be emphasized that this flow of circulating heat transfer fluid counter current to the gases in the condensing chamber (4) and to the liquids in the differential still (3) and evaporating chamber (4) also secures the highest possible efficiency in heat transfer and the lowest possible required difference in pressure between the gases in the condenser (2) and in the differential still (3) and evaporator (4).

From the foregoing description it will be apparent that by my method a mixture of gases such as air (or other gases) may be liquefied and separated by the use of very much lower pressures or pressure differences than those required in processes now used for such operations which, like the Linde process, depend upon the Joule-Thompson effect. This lower required pressure difference greatly cheapens the cost of the operation and cost of plant and greatly reduces the cost of separating such gas mixtures as mentioned.

It will also be apparent that the fundamental principle of my invention which consists in abstracting the heat of condensation of the gases at a higher pressure and thus liquefying the gases and utilizing this heat of condensation to evaporate the liquefied gases at a lower pressure is entirely different from either the Linde process which depends fundamentally upon the Joule-Thompson effect, or the Claude process, which is based upon the cooling secured by allowing a gaseous medium to do work while expanding. The importance of the counter-current heat transfer between the circulating liquid and the condensing gases and condensed liquids in securing the maximum efficiency in separation of the gases and the lowest possible pressure difference in my process will also be apparent from the foregoing. The importance of the efficient counter-current heat transfer from incoming mixed gases to outgoing separated gases secured by my preferred method and apparatus will also be apparent.

As previously noted, my process may be carried in various different arrangements of the essential parts of the apparatus. The different essential parts of the apparatus will also operate efficiently with considerable difference in detail of design. I therefore do not desire to be limited only to the special arrangement of the apparatus, or only to the particular design of the essential parts, shown and described except as these illustrate the process and as they are interpreted in the claims.

As previously emphasized, my method is applicable not only for the separation of oxygen and nitrogen in air but for the separation of other mixtures of gases such as carbon monoxide and hydrogen in water gas, etc. As also specified in the description, where the term air is used it is understood that the term gas mixture may be substituted and where the terms oxygen and nitrogen are used, it is understood that the terms gas of higher boiling point and gas of lower boiling point respectively, may be substituted so that specification covers the cases of gas mixtures other than air. Also in order to avoid a multiplicity of claims, I desire it specifically understood that where the terms air, oxygen and nitrogen are used in the claims that the terms gas mixture, gas of higher boiling point and gas of lower boiling point respectively may be substituted therefor, so that the claims shall cover and claim the separation of gases in gas mixtures other than air as well as the oxygen and nitrogen in air.

Having described my invention, what I claim and desire to patent is:

1. In the process of separating mixed gases which consists in cooling said mixed gases by transfer of heat therefrom to cold gas previously separated by said process, condensing said cooled gases to the liquid state, separating gas of lower boiling point from the mixed condensate by evaporation and rectification and evaporating the residual condensate containing the gas of higher boiling point, the improvement which consists in condensing the precooled mixed gases by transfer of the heat of condensation therefrom to a separate fluid heat transfer medium and thereby warming said medium, evaporating residual condensate from said rectifying operation by transfer of heat thereto from said last warmed heat transfer medium and thereby cooling said medium, evaporating gas of lower boiling point out of mixed condensate from said condensing operation by transfer of heat thereto from said last cooled heat transfer medium in said rectifying operation and thereby further cooling said last medium, condensing more precooled mixed gases by transfer of heat therefrom to said last further cooled medium and thereby warming said medium, evaporating more residual condensate and evaporating more gas of higher boiling point from more mixed condensate during rectification by transfer of heat thereto from said last warmed heat transfer medium, continuing said operations as described, and conducting said condensing operation under a sufficiently higher pressure than that maintained in said rectifying and final evaporating operations to secure the described transfers of heat to and from said heat interchange medium.

2. In the process of separating oxygen and nitrogen in air which consists in cooling said mixed gases by transfer of heat therefrom to cold gases previously separated by said process, condensing said cooled gases to the liquid state, separating nitrogen from the mixed condensate by evaporation and rectification and evaporating the residual condensate containing the oxygen, the improvement which consists in cooling the precooled air by transfer of the heat of condensation therefrom to a separate fluid heat transfer medium and thereby warming said medium, evaporating residual condensate from said rectifying operation by transfer of heat thereto from said last warmed heat transfer medium, evaporating nitrogen gas out of mixed condensate from said condensing operation by transfer of heat thereto from said last cooled heat transfer medium in said rectifying operation and thereby further cooling said last medium, condensing more precooled air by transfer of heat therefrom to said last further cooled medium and thereby warming said medium, evaporating more residual condensate and evaporating more nitrogen gas from more mixed condensate during rectification by transfer of heat thereto from said last warmed heat transfer medium, continuing said operations as described, and conducting said condensing operation under a sufficiently higher pressure than that maintained in said rectifying and final evaporating operations to secure above described transfers of heat to and from said heat interchange medium.

3. In the process of separating mixed gases which consist in cooling said mixed gases by transfer of heat therefrom to cold gas previously separated by said process, condensing said cooled gases to the liquid state, separating gas of lower boiling point from the mixed condensate by evaporation and rectification and evaporating the residual condensate containing the gas of higher boiling point, the improvement which consists in condensing the precooled mixed gases by transfer of the heat of condensation therefrom to a separate fluid heat transfer medium and thereby warming said medium, evaporating residual condensate from said rectifying operation by transfer of heat thereto from said last warmed heat transfer medium and thereby cooling said medium, evaporating gas of lower boiling point out of mixed condensate from said condensing operation by transfer of heat thereto from said last cooled heat transfer medium in said rectifying operation and thereby further cooling said last medium, condensing more precooled mixed gases by transfer of heat therefrom to said last further cooled medium and thereby warming said medium, evaporating more residual condensate and evaporating more gas of higher boiling point from more mixed condensate during rectification by transfer of heat thereto from said last warmed heat transfer medium, continuing said operations as described, and conducting said condensing operation under a sufficiently higher pressure than that maintained in said rectifying and final evaporating operations to secure the described transfers of heat to and from said heat interchange medium, and the further improvement which consists in conducting said transfer of heat in said condensing operation by countercurrent heat interchange between the stream of incoming precooled mixed gases and the stream of cold circulating heat interchange medium and thereby condensing said precooled gases into several separate successive selective condensates of successively diminishing content of gas of higher boiling point, and introducing said separate condensates into the stream of mixed condensates in process of rectification in the reverse order of their condensation and at points in said last stream which have compositions relatively similar to said separate condensates, and conducting said transfer of heat in said selective evaporating and rectifying operation by countercurrent heat interchange between the stream of mixed condensates and the stream of partly cooled circulating heat interchange medium.

4. In the process of separating oxygen and nitrogen in air which consists in cooling said mixed gases by transfer of heat therefrom to cold gases previously separated by said process, condensing said cooled gases to the liquid state, separating nitrogen from the mixed condensate by evaporation and rectification and evaporating the residual condensate containing the oxygen, the improvement which consists in cooling the precooled air by transfer of the heat of condensation therefrom to a separate fluid heat transfer medium and thereby warming said medium, evaporating residual condensate from said rectifying operation by transfer of heat thereto from said last warmed heat transfer medium, evaporating nitrogen gas out of mixed condensate from said condensing operation by transfer of heat thereto from said last cooled heat transfer medium in said rectifying operation and thereby further cooling said last medium, condensing more precooled air by transfer of heat therefrom to said last further cooled medium and thereby warming said medium, evaporating more residual condensate and evaporating more nitrogen gas from more mixed condensate during rectification by transfer of heat thereto from said last warmed heat transfer medium, continuing said operations as described, and conducting said condensing operation under a sufficiently higher pressure than that maintained in said rectifying and final evaporating operations to secure above described transfers of heat to and from said heat interchange medium, said condensing operation being conducted by counter-current heat interchange between the stream of incoming precooled air and the stream of cold circulating heat interchange medium, thereby condensing said precooled air into several separate successive selective condensates of successively diminishing oxygen content, and introducing said separate condensates into the stream of mixed condensates in process of rectification in the reverse order of their condensation and at points in said last stream which have compositions relatively similar to said separate condensates, further conducting said transfer of heat in said selective evaporating and rectifying operation by counter-current heat interchange between the stream of mixed condensates and the stream of partly cooled heat interchange medium.

5. The process claimed in claim 3 further characterized by the incoming stream of mixed gases being precooled by counter-current transfer of heat therefrom, first simultaneously to the two outgoing streams of cold separated gases, and thereafter to the one of said streams containing the gas of lowest boiling point whereby the gas in said last stream is heated substantially to the temperature of the gas in the other of said streams before the simultaneous transfer of heat to both streams begins.

6. In the process of separating oxygen and nitrogen in air which consists in cooling said mixed gases by transfer of heat therefrom to cold gases previously separated by said process, condensing said cooled gases to the liquid state, separating nitrogen from the mixed condensate by evaporation and rectification and evaporating the residual condensate containing the oxygen, the improvement which consists in cooling the precooled air by transfer of the heat of condensation therefrom to a separate fluid heat transfer medium and thereby warming said medium, evaporating residual condensate from said rectifying operation by transfer of heat thereto from said last warmed heat transfer medium, evaporating nitrogen gas out of mixed condensate from said condensing operation by transfer of heat thereto from said last cooled heat transfer medium in said rectifying operation and thereby further cooling said last medium, condensing more precooled air by transfer of heat therefrom to said last further cooled medium and thereby warming said medium, evaporating more residual condensate and evaporating more nitrogen gas from more mixed condensate during rectification by transfer of heat thereto from said last warmed heat transfer medium, continuing said operations as described, and conducting said condensing operation under a sufficiently higher pressure than that maintained in said rectifying and final evaporating operations to secure above described transfers of heat to and from said heat interchange medium, said condensing operation being conducted by counter-current heat interchange between the stream of incoming precooled air and the stream of cold circulating heat interchange medium, thereby condensing said precooled air into several separate successive selective condensates of successively diminishing oxygen content, and introducing said separate condensates into the stream of mixed condensates in process of rectification in the reverse order of their condensation and at points in said last stream which have compositions relatively similar to said separate condensates, further conducting said transfer of heat in said selective evaporating and rectifying operation by counter-current heat interchange between the stream of mixed condensates and the stream of partly cooled heat interchange medium, the incoming stream of air being precooled by counter-current transfer of heat therefrom, first simultaneously to the two outgoing streams of cold separated gases, and thereafter to the stream of nitrogen, whereby the gas in the nitrogen stream is heated substantially to the temperature of the gas in the oxygen stream before the simultaneous transfer of heat to both streams begins.

NIELS C. CHRISTENSEN.